Feb. 26, 1924. 1,485,180
O. D. GRAY
FRICTION MATERIAL
Filed June 5, 1922

Inventor
Orrin D. Gray

Patented Feb. 26, 1924.

1,485,180

UNITED STATES PATENT OFFICE.

ORRIN D. GRAY, OF CHICAGO, ILLINOIS, ASSIGNOR TO ADVANCE AUTOMOBILE ACCESSORIES CORPORATION, OF CHICAGO, ILLINOIS, A CORPORATION OF DELAWARE.

FRICTION MATERIAL.

Application filed June 5, 1922. Serial No. 565,908.

*To all whom it may concern:*

Be it known that I, ORRIN D. GRAY, a citizen of the United States, residing at Chicago, in the county of Cook and State of Illinois, have invented certain new and useful Improvements in Friction Materials, of which the following is a specification.

This invention relates to a material having special frictional properties and lubricating means associated therewith for aiding the material in resisting the destructive effects of heat, wear, etc.

It is possible to embody my invention in numerous forms and to select the base material therefor from any one of several different substances which are endowed with the requisite properties. As a suggestive embodiment of the invention, the description to follow will deal with a base material of cork having a hardened lubricant such as graphite, tallow, or grease associated therewith. A friction material of this character may, if desired, be mounted in a retaining element and be applied to any of the usual frictional uses, such, for instance, as with the braking mechanism of an automobile.

Referring to the drawing.

The frictional material of my invention is here represented as in the form of inserts 5 carried within a retainer 6 which is suitably mounted within a flexible steel band 7 the ends of which are equipped with lugs 8 for cooperation with a clamping device (not shown). By some such means as this, the band may be tightened about a revolving element whose speed of rotation is to be checked. In such a construction, the lining is preferably formed of a fabric strip made of some such material as cotton, and to enhance its aptitude for this service it may be treated with pitches, stearines, oils, or otherwise. In such a lining are formed a plurality of circular openings in each of which is received an insert of cork or other suitable friction material, the rear side or base of the cork, which backs up against the band, being preferably of enlarged diameter as is usual with linings of this character. It is desirable that each insert should protrude slightly beyond the friction face of the lining so as to initially engage with the element whose speed is to be checked.

A construction such as has thus far been described is well known and in common use. Even under the most favorable conditions, however, where the band, together with the lining, operates within a housing wherein oil is freely circulated, the heat generated by friction will cause the lining, together with its inserts, to become burned and charred, and the engaging faces thereof hardened and glazed, thereby rendering the material unfit for further service. This is due in large part to inability to feed oil in sufficient quantities to the friction faces where its presence is most needed. It is principally to overcome this deficiency in lubrication that my invention is designed.

Figure 1:
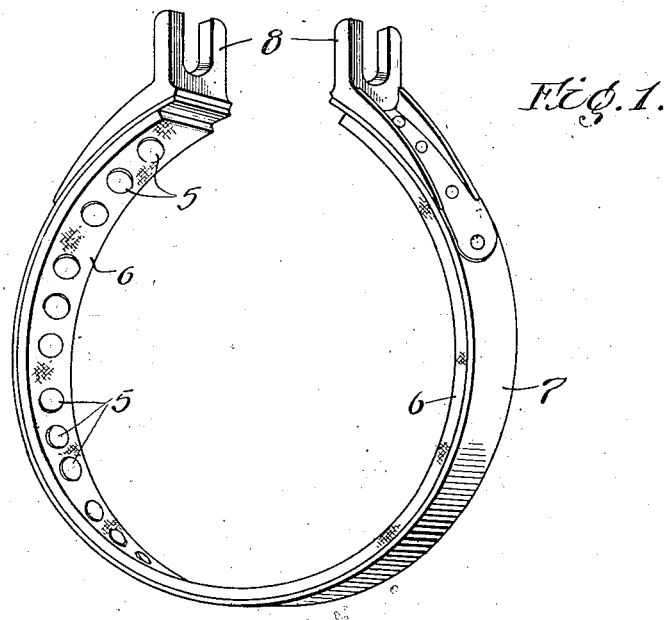
Figure 1 shows by way of illustration a split band equipped on its inner face with a fabric lining containing friction inserts of cork each having a hardened lubricant associated therewith, the band being such as is ordinarily used with automobiles employing a planetary gear transmission and braking system.
Figure 2:
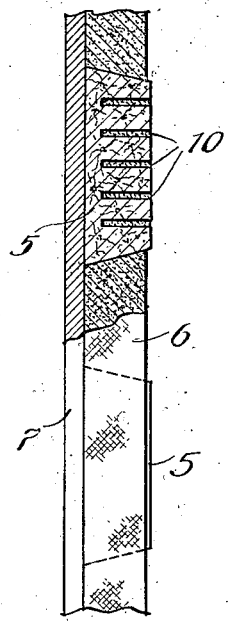
Fig. 2 is an enlarged fragmentary view in longitudinal section through the band, lining, and inserts therein.
Figure 3:
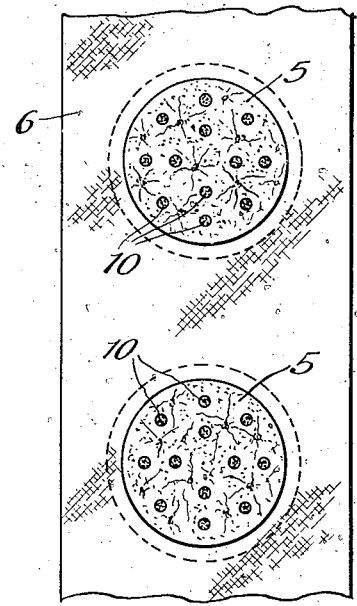
Fig. 3 is an enlarged fragmentary view in elevation looking toward the friction face of the lining and inserts carried therein.

I have already suggested that the friction material of this invention may advantageously use cork for its base. This is for the reason that cork has a high co-efficient of friction, is yieldable under pressure so as to apply a gentle braking action against the surface with which it engages, and will withstand longer than most materials the destructive effects of the heat and wear incidental to service. It is to be understood that any other material having characteristics such as these may also be employed. In the case of cork, its body is comparatively impervious, is non-porous, and is generally cellular in structure. For these reasons it is incapable of absorbing into its body any supply of oil such as to overcome the effects of heat which generates when pressure is applied to force the friction material against a moving surface. This deficiency, which is due entirely to natural reasons, I overcome in part by forming in the inserts a plurality of small holes or pockets 10 each extending well into its body from the friction face thereof, as indicated best in Figs. 2 and 3. In each of these holes or pockets is packed a quantity of hardened lubricant, such as tallow, grease or graphite.

As each of these openings containing such a lubricant is exposed upon the friction face of the material, it follows that the lubricant will be fed automatically against the surface moving thereover when pressure is applied to force the inserts thereagainst. This feeding action is enhanced both by the heat which tends to generate with friction, and by the compression which takes place in the body of the insert when the same is forced against the moving part. It follows, therefore, that the feeding action of the lubricant is induced both by natural and mechanical means. The effect of supplying the lubricant to the wearing face of the inserts in the manner explained is, of course, to preserve the inserts and associated retainer against excessive heat such as tends to burn and char their friction faces, thereby rendering the same unsuitable for further service.

It is to be noted that the base material of cork, wherein is carried the lubricant, is a relative non-conductor of heat. This is of particular advantage since results much less satisfactory are obtainable if the lubricant be retained within a base material which tends quickly to heat and transmit such heat to the lubricant therewithin. It is accordingly one aspect of this invention that the base wherein the lubricant is carried should itself be a relative non-conductor of heat, as well as a friction material of the kind noted.

It is obvious that the particular form and combination of materials herein shown and described may be varied, and the particular uses to which the same may be applied may be other than that suggested. The features of novelty which characterize my invention, as defined in the claims below, include the combination with a base material, which is preferably compressible, a non-conductor of heat, and a friction agent, of a lubricant adapted to be released or fed to its engaging surface as pressure is applied for this purpose.

I claim:

1. A friction material having a base of cork with which is associated a solidified lubricant, and yielding means for retaining the cork in operative position against a moving surface, substantially as described.

2. In combination with a band having a fabric lining adapted to be pressed against a moving surface, a compressible friction insert carried in the lining in a manner to present one face yieldably against the moving surface, and a solidified lubricant carried within the body of the insert in a manner to be exposed to the moving surface and adapted to be mechanically fed thereagainst with yielding of the insert under pressure, substantially as described.

3. In combination with a metallic band having a yieldable lining adapted to be pressed against a moving surface, a compressible friction insert carried in the lining in a manner to present one face against the moving surface, the insert incorporating into its body a quantity of solidified lubricant which is exposed to the moving surface whereby under the application of pressure the body of the insert is displaced within the lining and squeezed against the lubricant to feed the same toward the moving surface, substantially as described.

4. In combination with a moving surface, means for applying friction thereto including a quantity of solidified lubricant, a cork body in which the lubricant is contained and adapted to present one of its faces, as well as a portion of the lubricant, in frictional contact with the moving surface, and a mounting for the cork body comprising a fabric lining formed with an opening wherein the body of the cork is secured and into which it may recede under the application of pressure whereby the lining is itself presented frictionally to the moving surface, and a band whereon the lining is secured and against which the cork body is rested unyieldingly, the body of the cork being displaceable laterally within the lining under the application of pressure, substantially as described.

ORRIN D. GRAY.

Witness:
EPHRAIM BANNING.